US006932403B2

(12) United States Patent
Meijer et al.

(10) Patent No.: US 6,932,403 B2
(45) Date of Patent: Aug. 23, 2005

(54) VEHICLE SLIDE OUT ASSEMBLY ACTUATING MECHANISM AND METHOD OF OPERATION

(75) Inventors: Bert Meijer, Overdinkel (NL); Haiko Freriksen, Hengelo (NL)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 10/695,268

(22) Filed: Oct. 28, 2003

(65) Prior Publication Data
US 2004/0130173 A1 Jul. 8, 2004

Related U.S. Application Data

(63) Continuation-in-part of application No. 10/301,120, filed on Nov. 21, 2002, now Pat. No. 6,655,723.
(60) Provisional application No. 60/332,161, filed on Nov. 21, 2001.

(51) Int. Cl.[7] .................................................. B60P 3/34
(52) U.S. Cl. .................................. 296/26.01; 296/26.13
(58) Field of Search ............................ 296/26.01, 26.13

(56) References Cited

U.S. PATENT DOCUMENTS

| | | | | |
|---|---|---|---|---|
| 4,184,314 A | * | 1/1980 | Hobbs | .......................... 56/372 |
| 4,495,961 A | | 1/1985 | Brunner | |
| 4,531,536 A | | 7/1985 | Kosarzecki | |
| 5,154,469 A | | 10/1992 | Morrow | |
| 5,291,701 A | * | 3/1994 | Delacollette et al. | .......... 52/67 |
| 5,577,351 A | | 11/1996 | Dewald, Jr. et al. | |
| 5,758,918 A | | 6/1998 | Schneider et al. | |
| 5,785,373 A | | 7/1998 | Futrell et al. | |
| 5,788,306 A | | 8/1998 | DiBiagio et al. | |
| 5,857,733 A | | 1/1999 | Dewald, Jr. et al. | |
| 6,116,671 A | | 9/2000 | Schneider | |
| 6,202,362 B1 | | 3/2001 | McManus et al. | |
| 6,227,607 B1 | | 5/2001 | Dewald, Jr. et al. | |
| 6,305,739 B1 | * | 10/2001 | Corona | ....................... 296/165 |
| 6,471,275 B1 | * | 10/2002 | Kunz et al. | .............. 296/26.01 |
| 6,572,170 B2 | | 6/2003 | McManus et al. | |
| 6,575,514 B2 | * | 6/2003 | McManus et al. | ....... 296/26.01 |

OTHER PUBLICATIONS

T. Hunt et al., The Hydraulic Handbook, 9th Edition, 1996, pp168–170, Elsevier Science.

* cited by examiner

Primary Examiner—Dennis H. Pedder
(74) Attorney, Agent, or Firm—Quarles & Brady LLP

(57) ABSTRACT

A slide out actuating mechanism for selectively extending and retracting a slidable section of a slide out assembly fixed to a vehicle body includes at least two double acting fluid actuated actuators. Each actuator has a cylinder and an extendible ram. Each cylinder is fixed relative to one of the vehicle body and the slidable section, and each ram is fixed relative to the other of the vehicle body and the slidable section. At least one flow divider having at least two fluid ports directs fluid to and from the cylinders. One of the fluid ports is in fluid communication with one of the cylinders and the other of the fluid ports being in fluid communication with the other of the cylinders, wherein the flow divider maintains the flow of fluid flowing through the ports at substantially equal flow rates to synchronize movement of the rams when moving the rams relative to the cylinders.

3 Claims, 15 Drawing Sheets

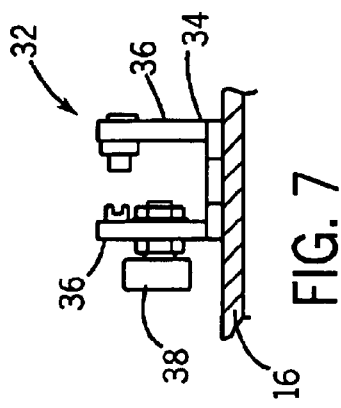
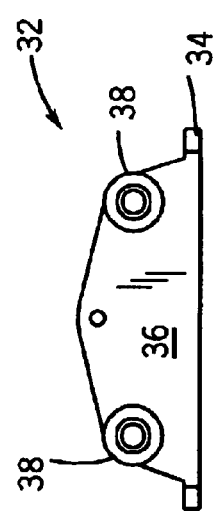
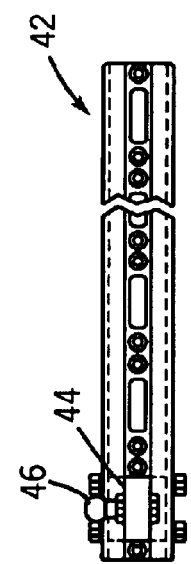
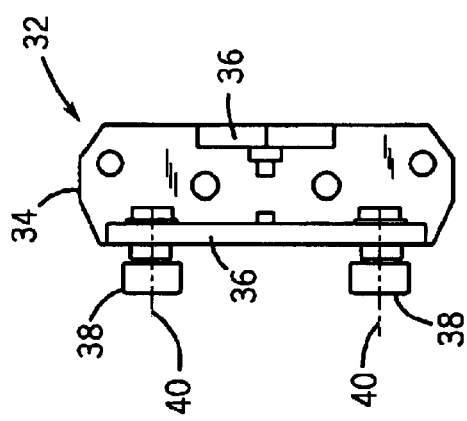
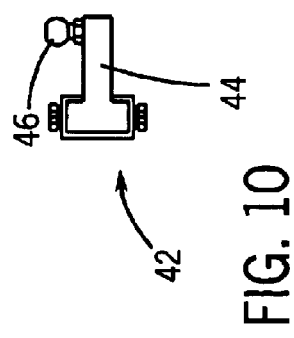
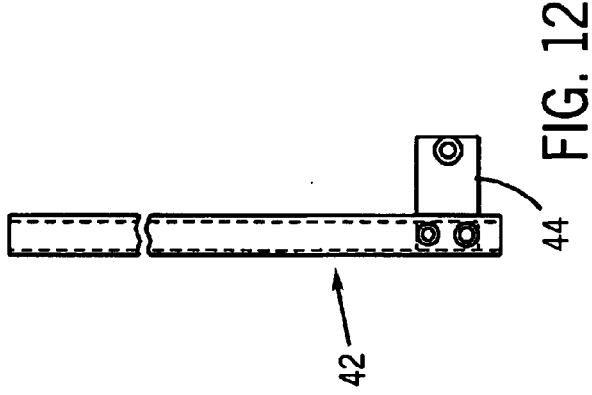

VEHICLE SLIDE OUT ASSEMBLY ACTUATING MECHANISM AND METHOD OF OPERATION

CROSS REFERENCES TO RELATED APPLICATIONS

This application is a continuation-in-part of U.S. patent application Ser. No. 10/301,120 filed on Nov. 21, 2002 now U.S. Pat. No. 6,655,723 which claims the priority benefit of U.S. Provisional Patent Application No. 60/332,161 filed on Nov. 21, 2001.

STATEMENT REGARDING FEDERALLY SPONSORED RESEARCH

Not Applicable

BACKGROUND OF THE INVENTION

This invention relates to vehicles having expandable room sections, and more particularly to a slide out assembly actuating mechanism and method of operation for use in vehicles, wherein the slide out assembly includes two or more fluid actuators for moving a slide out section between an extended and retracted position.

In order to increase the available interior space of recreational vehicles or trailers, it is known to provide a raised platform slide out section as part of the structure of the vehicle or trailer. The slide out section includes a raised platform, usable as seating, a sleeping platform, and the like, which is enclosed on all but one side. During transit, the slide out section is retracted and stored in the interior of the vehicle or trailer, with the exterior wall of the slide out section approximately flush with the exterior of the vehicle or trailer. To use the slide out section, the vehicle is first parked and leveled. The slide out room section is then slid outward from the vehicle to an extended position, increasing the interior space of the vehicle.

In prior art constructions, the slide out room section is moved between the extended and retracted position by an actuating mechanism driven by an electric motor, such as a rack and pinion system. The rack is typically fixed to the slide out section and a rotatably driven pinion is fixed to the vehicle body. These prior art constructions are adequate for many applications, however, they can be inefficient and are noisy.

Another known actuating mechanism incorporates hydraulic actuators that are actuated to extend and retract the slide out section. In slide out actuating mechanisms including two or more hydraulic or pneumatic actuators, fluid is pumped into each actuator at the same rate in order to extend the actuator rams together. Forces exerted on the slide out, such as by friction, an obstruction, and the like, can increase the pressure in one of the cylinders and reduce the flow of fluid into that cylinder which causes the ram of the one actuator to be extended less then the other actuators. This unbalanced condition can cause the slide out section to skew and become jammed. Therefore, a need exists for a vehicle slide out assembly actuating mechanism that synchronizes two or more fluid actuators to avoid skewing the slide out.

SUMMARY OF THE INVENTION

The present invention provides a slide out actuating mechanism for selectively extending and retracting a slidable section of a slide out assembly fixed to a vehicle body. The slide out actuating mechanism includes at least two double acting fluid actuated actuators. Each actuator has a cylinder and an extendible ram. Each cylinder is fixed relative to one of the vehicle body and the slidable section, and each ram is fixed relative to the other of the vehicle body and the slidable section. At least one flow divider having at least two fluid ports directs fluid to and from the cylinders. One of the fluid ports is in fluid communication with one of the cylinders and the other of the fluid ports is in fluid communication with the other cylinder, wherein the flow divider maintains the flow of fluid flowing through the ports at substantially equal flow rates to synchronize movement of the rams when moving the rams relative to the cylinders.

A general objective of the present invention is to provide a vehicle having a slide out section which extends without skewing. This objective is accomplished by providing an actuating mechanism having two or more hydraulic actuators which are extended and retracted at approximately the same speed using one or more flow dividers to direct hydraulic fluid to the hydraulic actuator encountering more resistance than the other hydraulic actuators.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 7 is an end view of the bracket of FIG. 6;

FIG. 8 is a side view of the bracket of FIG. 6;

FIG. 9 is a top view of the bracket of FIG. 6;

FIG. 10 is an end view of the rail of FIG. 6;

FIG. 11 is an side view of the rail of FIG. 6;

FIG. 12 is a top view of the rail of FIG. 6;

DETAILED DESCRIPTION OF THE INVENTION

The present invention provides a slide out assembly attached to a known trailer or recreational vehicle which provides distinct advantages over the prior art as will be described and appreciated hereafter. In the preferred embodiment, the trailer or recreational vehicle (generally referred to as the vehicle) is equipped with a slide out section used to provide additional interior room space. However, it should be understood that the invention can also apply to expandable sections or compartments provided on other vehicles for use in construction, military, medical, education, mobile broadcast and other applications, to expand the inside volume of the vehicle.

Figure 1:
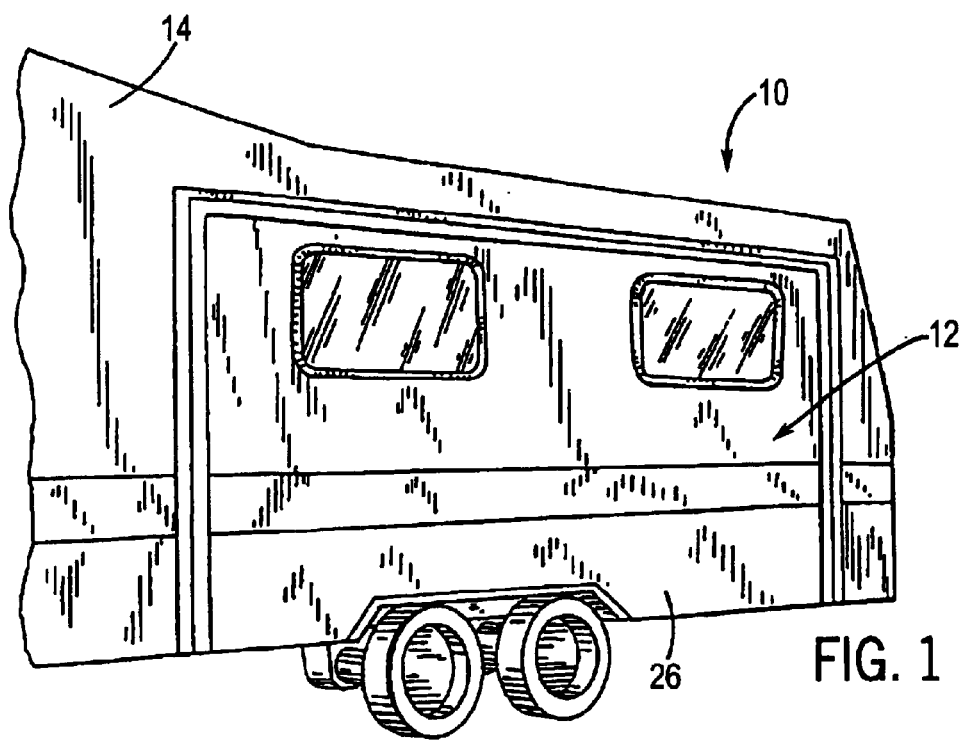
FIG. 1 is a side view of a vehicle having a slide out section incorporating the present invention mounted thereon in a retracted position.
Figure 2:
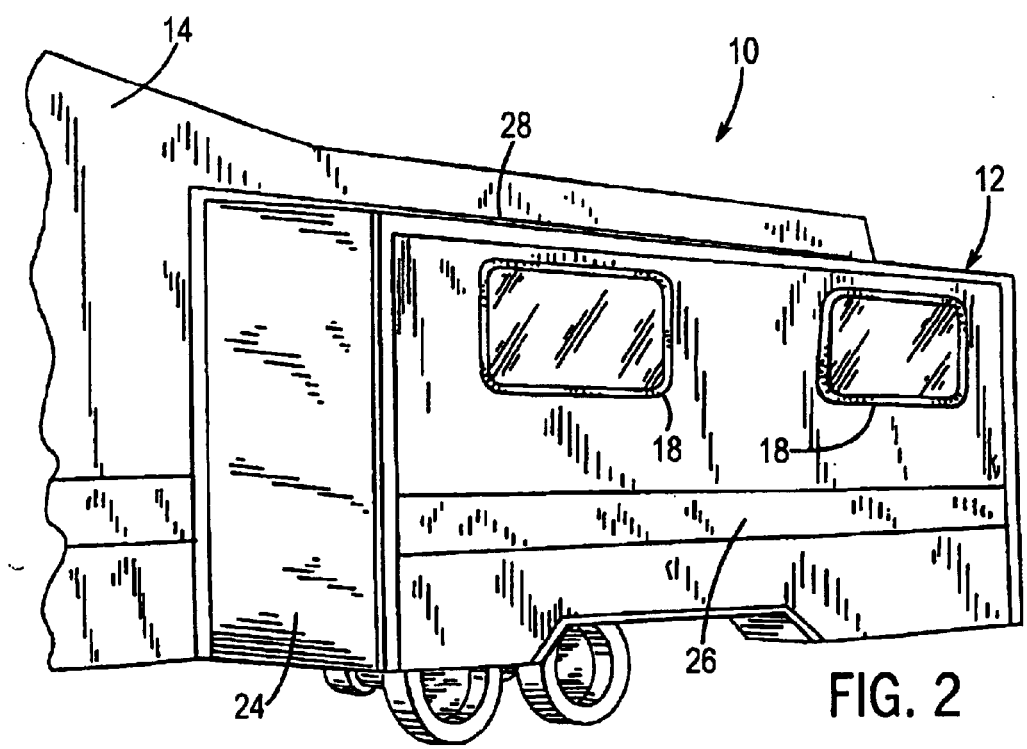
FIG. 2 is a side view of the vehicle of FIG. 1 in which the slide section is in an extended position.
Figure 3:
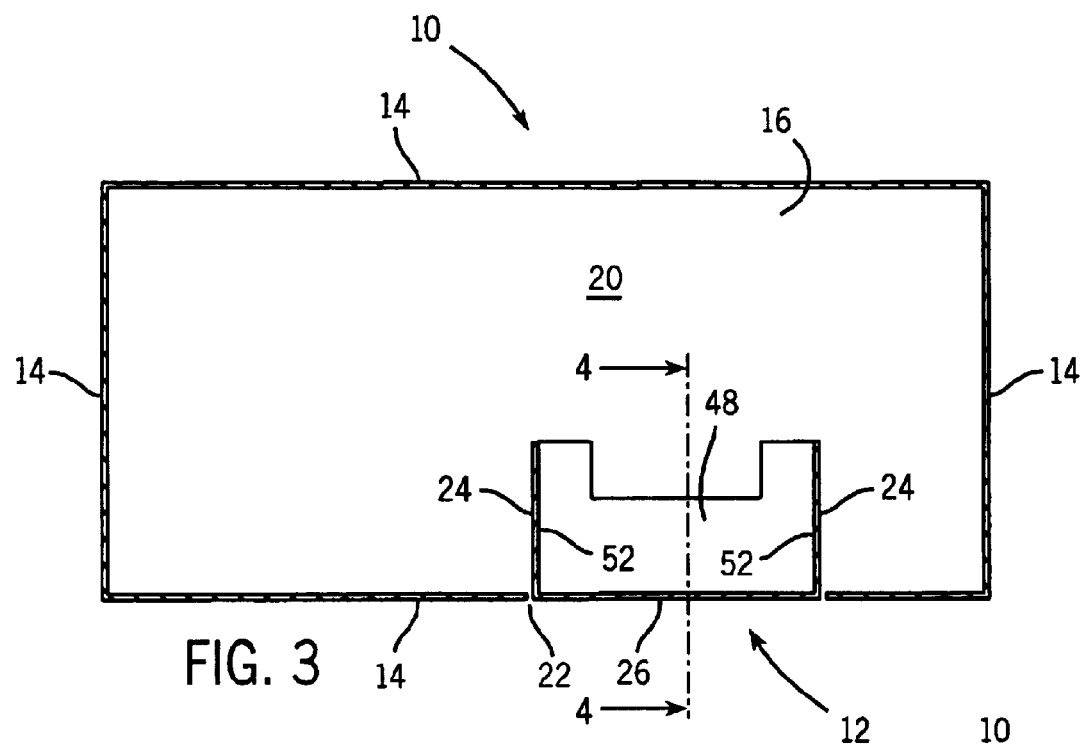
FIG. 3 is a top plan view of the vehicle of FIG. 1.

FIG. 1 illustrates the vehicle body 10 having mounted thereon an expandable, telescopic slide out room section 12 incorporating the present invention in its fully retracted position. FIG. 2 is a similar view with the slide out section 12 fully extended.

As shown in FIGS. 3–12, the vehicle 10 includes exterior walls 14 surrounding a stationary floor 16 covered by a vehicle roof 18 to define a vehicle interior 20. An opening 22 formed in one of the exterior walls 14 receives the slide out section 12 supported above the stationary floor 16.

The slide out section 12 includes a pair of sidewalls 24 extending from a movable exterior wall 26. When the slide out section 12 is fully retracted, the exterior wall 26 is substantially flush with the vehicle exterior wall 14, and closes the vehicle exterior wall opening 22. The pair of slide out section sidewalls 24 extend inwardly through the opening 22 towards the vehicle interior 20 from opposing side edges of the slide out section exterior wall 26. A top plate 28 proximal a top edge of the slide out section exterior wall 26 extends generally parallel to the vehicle stationary floor 16 through the opening 22 towards the vehicle interior 20. A fascia plate 30 proximal an interior edge of the top plate 28 extends upwardly from the top plate 28 toward the vehicle roof 18. Elastomeric seals, such as rubber seals, are fixed between the slide out section when the slide out section is fully extended and fully retracted. The seals protect the vehicle interior 20 from adverse weather conditions.

The slide out section 12 is supported above the vehicle stationary floor 16 by a pair of U-shaped brackets 32. Each bracket 32 has a base 34 fixed to the vehicle stationary floor 16 using methods known in the art, such as bolting. A pair of legs 36 extend upwardly from the base 34 to form the U-shape. Rollers 38 are rotatably mounted to one of the legs 36, and have axes 40 which are substantially perpendicular to the slide out section direction of travel The rollers 38 support an elongated rail 42 fixed to each slide out section sidewall 24.

Each rail 42 has a C-profile which wraps around the rollers 38, and is fixed to one of the slide out section sidewalls 24. The rail 42 slidably moves in a longitudinal direction as the slide out section 12 moves between the retracted and extended positions. A hitch 44 having a ball 46 is fixed to the rail 42, and extends substantially parallel to the roller axes 40. Although a rail having a C-profile engaging rollers is disclosed, rails having other profiles such as a square, circular, U-shape, and the like, can be used without departing from the scope of the invention. Moreover, the rail can be supported by a low friction surface, such as UHMW, bearings, lubricated surface, and the like without departing from the scope of the invention.

Figure 5:
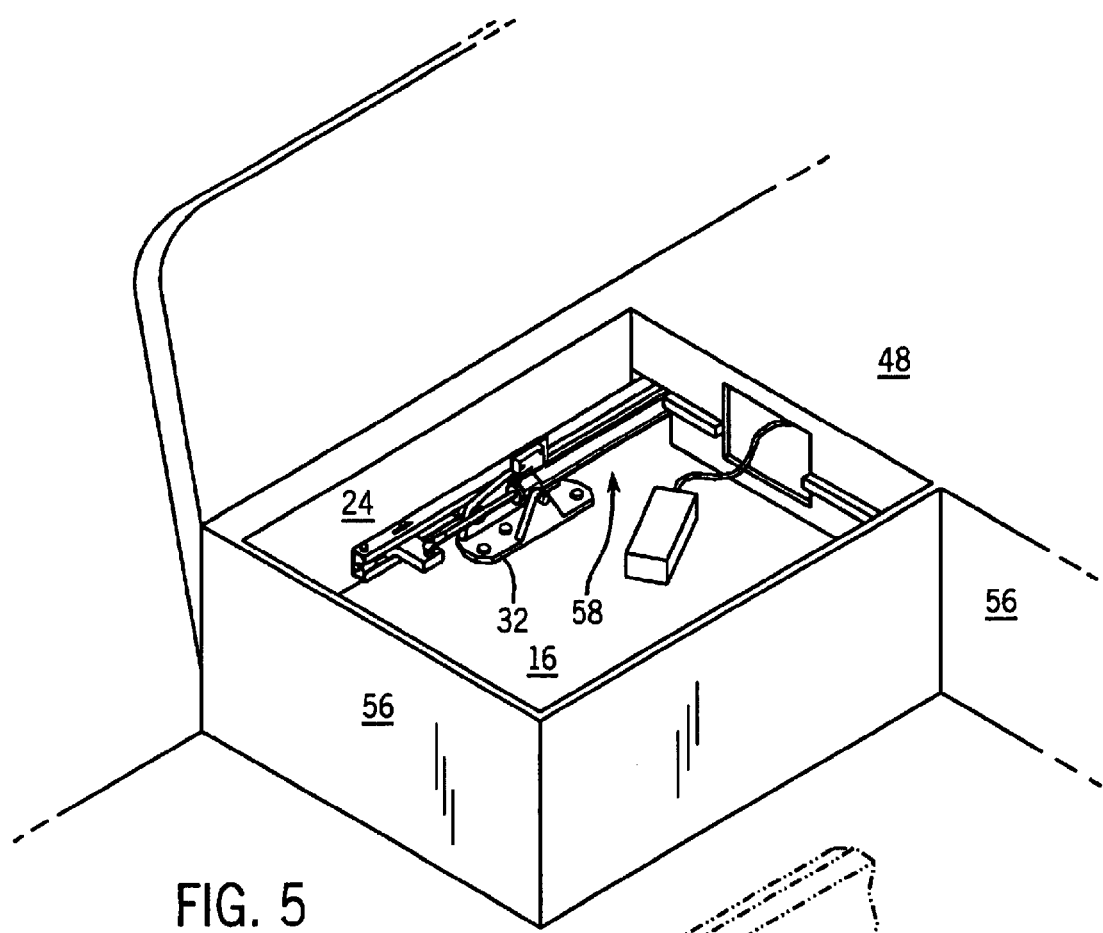
FIG. 5 is a view of the platform with a portion removed to reveal the actuator supporting one side of the slide out section.
Figure 6:
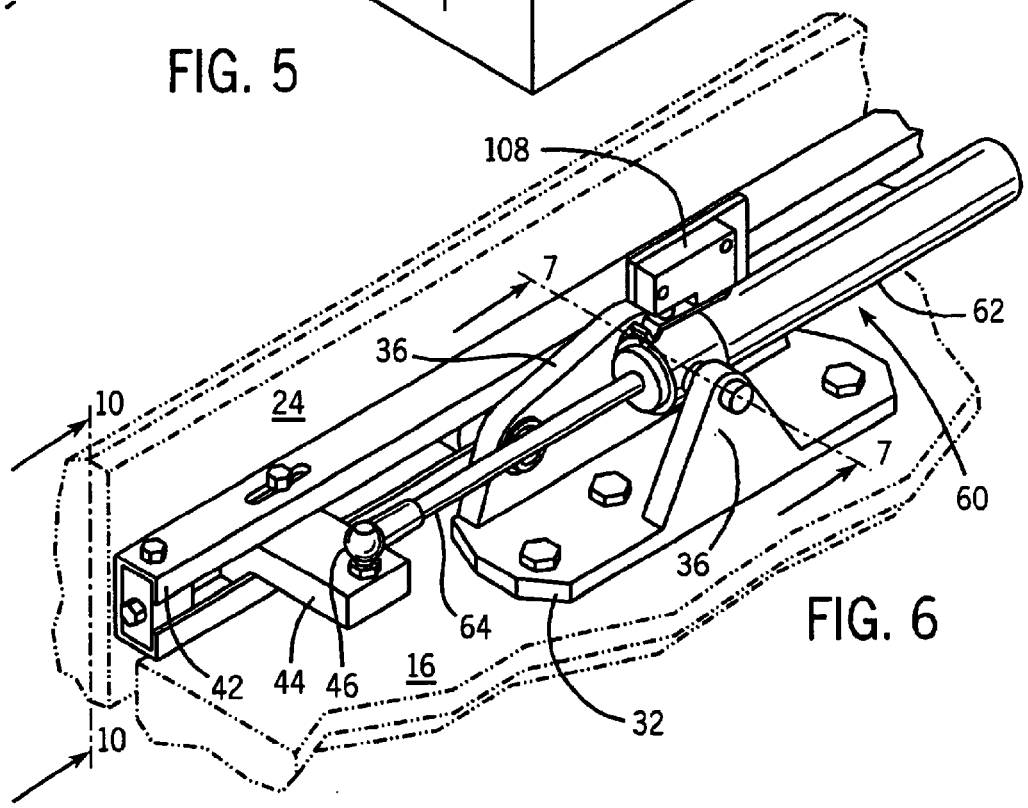
FIG. 6 is a view of the bracket supporting the rail connected to the actuator.

A platform 48, such as suitable for use as a bench, bed base, and the like, is fixed between the slide out section sidewalls 24 above the vehicle stationary floor 16. The platform 48 is U-shaped having a rear edge 50 fixed to the slide out section exterior wall 26, a pair of opposing side edges 52 fixed to the slide out section sidewalls 24, and a front edge 54. A front plate 56 extends downwardly from the platform front edge 54 toward the vehicle stationary floor 16. Preferably, the platform 48 has removable portions (such as shown in FIG. 5) to provide access to a slide out actuating assembly 58.

The slide out actuating assembly 58 is housed beneath the platform 48, and includes a pair of double actuating hydraulic actuators 60 which urge the slide out section 12 between the extended and retracted positions. Each actuator 60 has a cylinder 62 fixed to one of the brackets 32 and an extendible ram 64 fixed to the ball 46 of one of the rails 42. Extension of the ram 64 drives the slide out section 12 from the extended position to the retracted position. Likewise, retraction of the ram 64 pulls the slide out section 12 from the retracted position to the extended position. Advantageously, retracting the rams 64 to extend the slide out section 12 minimizes the required space beneath the platform 48 for housing the slide out actuating assembly 58 by minimizing the length of the hydraulic actuators 60 when the least amount of space underneath the platform 48 is available for housing the slide out actuating assembly 58.

Referring now to FIGS. 13–17, the hydraulic actuators 60 are actuated by a hydraulic circuit 66 which drives the actuator rams 64 at approximately the same speed to avoid skewing. The hydraulic circuit 66 includes an extension circuit 68 which supplies hydraulic fluid to one end 70 of each hydraulic actuator 60 to extend the rams 64, and a retraction circuit 72 which supplies hydraulic fluid to the other end 74 of each hydraulic actuator 60 to retract the rams 64. A pump 76 supplies fluid to the desired circuit 68, 72 depending upon the operator selected pump direction. The pump 76 is electrically connected to an electronic control unit 78 which controls the pump operation, and thus the movement of the slide out section 12.

The extension circuit 68 and retraction circuit 72 are substantially identical with the difference being which end 70, 74 of the hydraulic actuator 60 is supplied with hydraulic fluid. Accordingly, the following description is made with reference to the retraction circuit 72 with the understanding that the description also applies to the extension circuit 68.

The retraction circuit 72 includes a main supply line 80 having a pressure relief valve 84 and a pilot operated check valve 86. The pressure relief valve 84 is automatically opened to allow fluid to flow into a reservoir 87 when fluid pressure in the main supply line 80 exceeds a predetermined value.

The pilot operated check valve 86 operates to allow fluid to flow toward the actuators 60 and prevent the fluid from flowing in the reverse direction. A pilot line 88 connects the check valve 86 in the retraction circuit supply line 82 to an extension circuit supply line 80. A positive pressure in the extension circuit supply line 80 sensed by the pilot line 88 opens the check valve 86 to allow hydraulic fluid to flow in the reverse direction away from the actuators 60 past the check valve 84. For example, when the pilot line 88 connecting the retraction circuit check valve 86 and the extension circuit supply line 80 senses a positive pressure in the extension circuit supply line 80, the retraction circuit check valve 86 is opened to allow hydraulic fluid draining from the hydraulic actuator ends 74 to flow past the retraction circuit check valve 86 back toward to the pump 76. The fluid flowing back to the pump 76 is then pumped into the extension circuit supply line 82.

The retraction circuit supply line 82 supplies hydraulic fluid to a flow divider 90 which splits the hydraulic fluid between left and right branch lines 92, 94. Each branch line 92, 94 feeds the end 74 of one hydraulic actuator 60. Drain lines 96 divert the flow of hydraulic fluid from each branch line 92, 94 around the flow divider 90 to the supply line 82 when evacuating fluid from the end 74 of the hydraulic actuator 60.

The flow divider 90 diverts hydraulic fluid through the branch lines 92, 94 to the hydraulic actuators 60 depending upon the hydraulic pressure in the actuators 60 using a pilot operated spool valve 98. A pilot line 100 in the left branch line 92 exerts a pressure against the spool valve 98 to urge the spool valve 98 toward the right against a pressure exerted by a second pilot line 102 in the right branch line 94 which urges the spool valve 98 to the left. Orifices 104 upstream of the spool valve 98 in each branch line 92, 94 prevent the flow of hydraulic fluid above a predetermined flow rate. Preferably, the predetermined flow rate is less than the flow rate capacity of the spool valve 98.

Moving the spool valve 98 to the right increases the flow of hydraulic fluid to the left branch line 92 while decreasing the flow of hydraulic fluid to the right branch line 94, and vice versa. As a result, when one branch line 92, 94 has a hydraulic fluid pressure which is greater than the other branch line 94, 92, more hydraulic fluid is diverted to the branch line 92, 94 having the greater pressure at the expense of the other branch line 94, 92. Advantageously, diverting hydraulic fluid to the branch line 92, 94 having a higher pressure using the flow divider 90 causes the actuator rams 60 to move at the substantially same speed automatically by directing hydraulic fluid to the hydraulic actuator 60 which is encountering more resistance than the other hydraulic actuator 60, thus avoiding skewing. In addition, the flow divider ensures the elastomeric seal is uniformly compressed to provide a tight seal around the vehicle opening 22.

Figure 13:
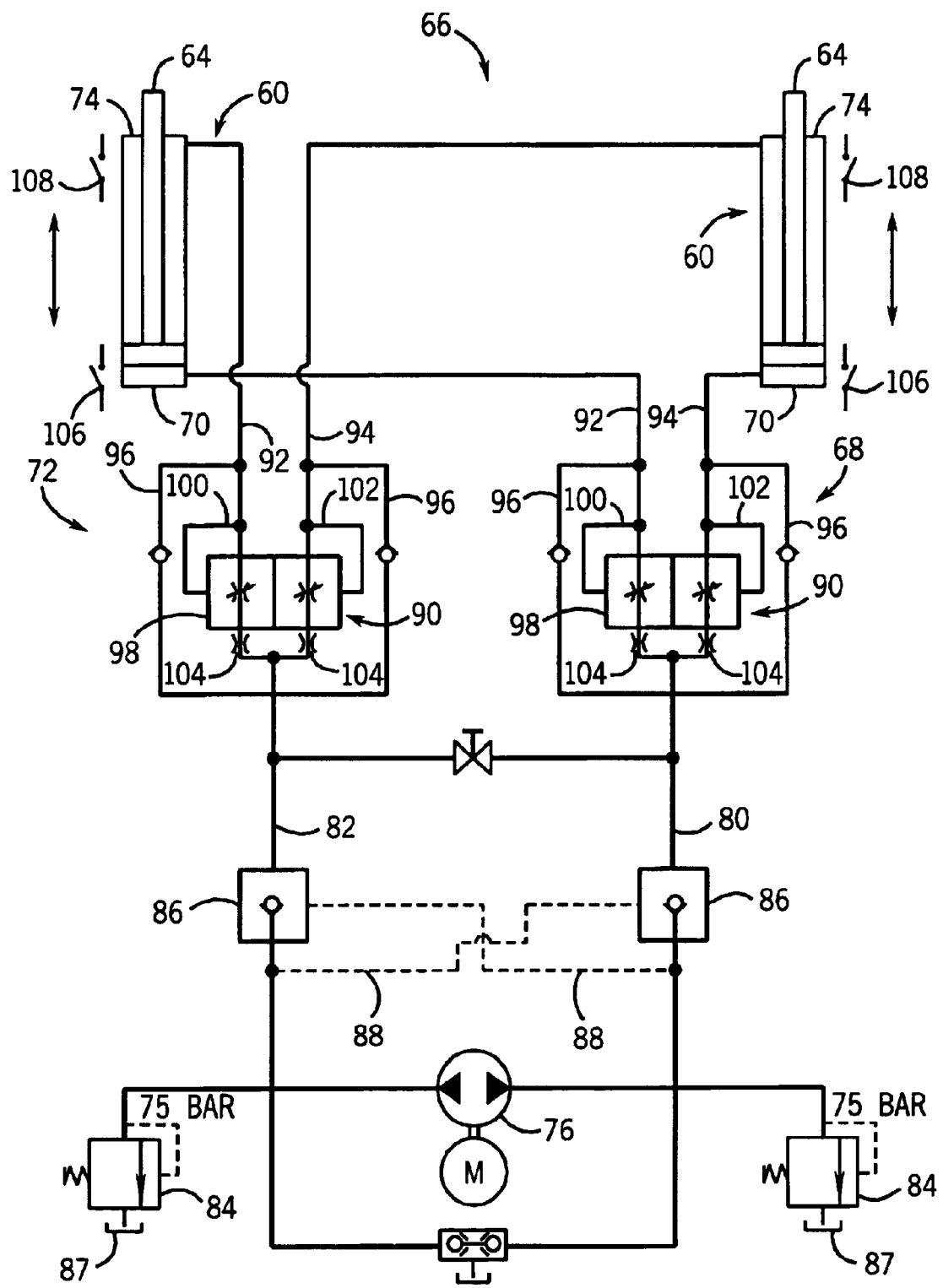
FIG. 13 is a hydraulic diagram of the slide out actuating assembly.
Figure 14:
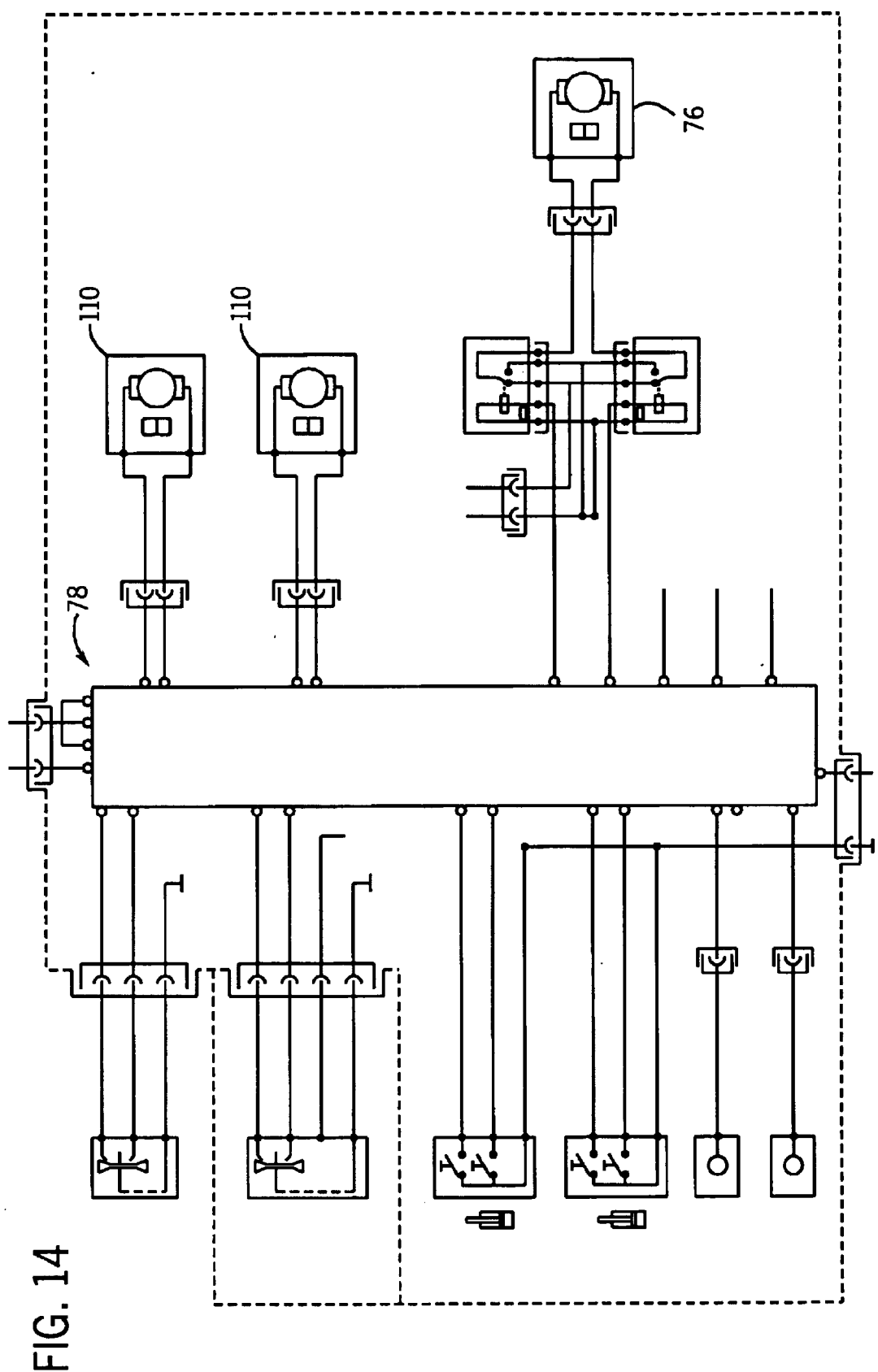
FIG. 14 is a schematic of the electronic control unit for use with the slide out actuating assembly of FIG. 13.
Figure 15:
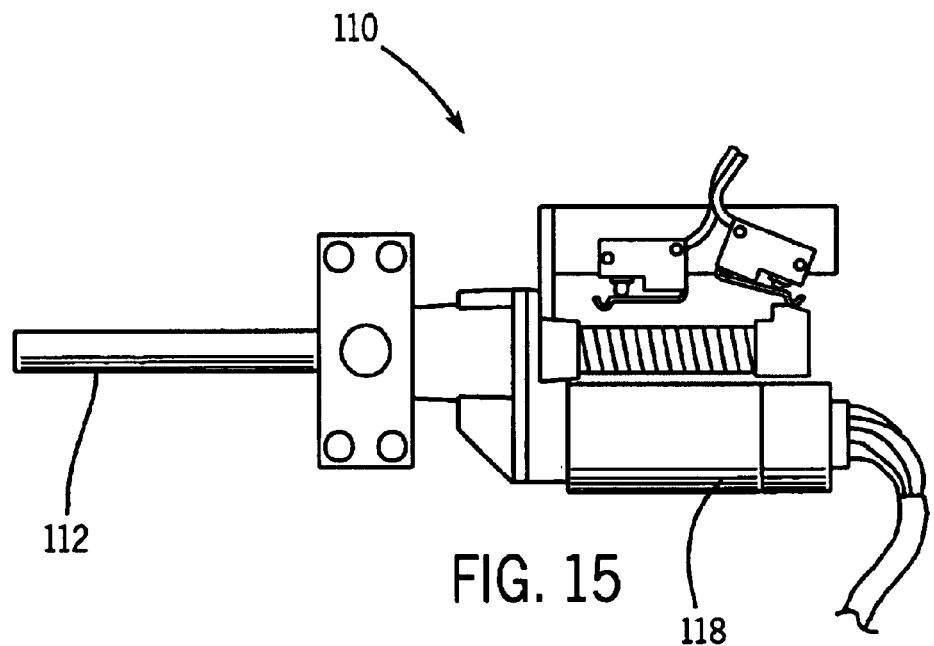
FIG. 15 is a perspective view of the latch fully retracted
Figure 16:
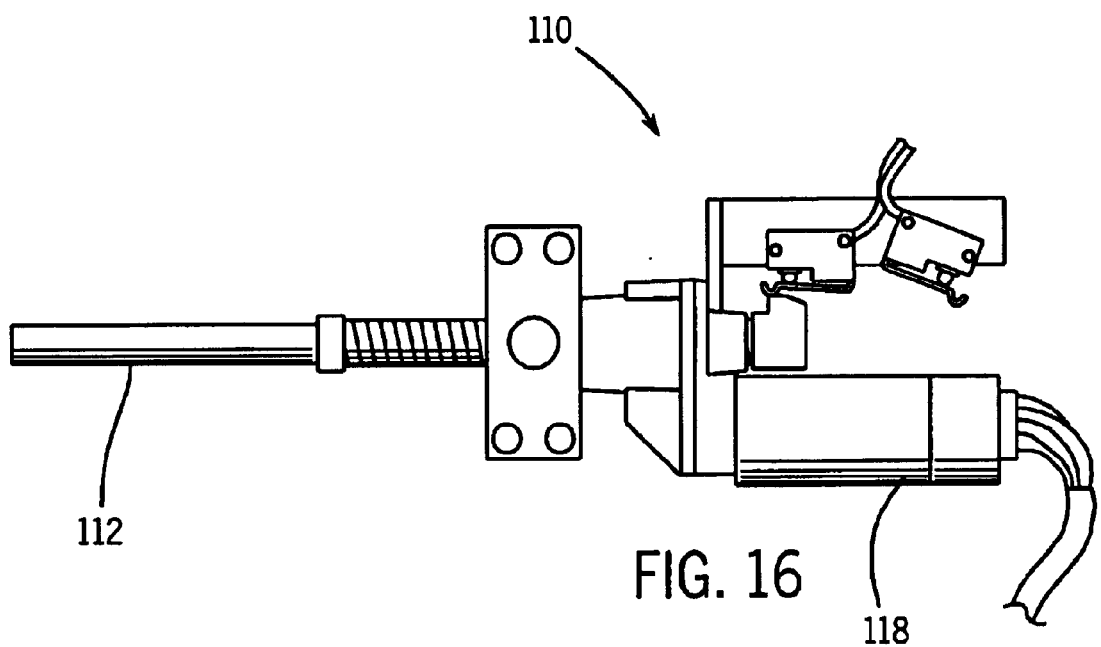
FIG. 16 is a perspective of the latch fully extended.

The electronic control unit 78 receives inputs from limit switches 106, 108 to determine whether the slide out section 12 is in the extended or retracted position. Preferably, as shown in FIG. 13, a limit switch 106, 108 is positioned adjacent each end 70, 74 of each actuator 60 to determine whether all of the actuator rams 64 are fully extended or fully retracted. In one embodiment, the electronic control unit 78 includes a radio frequency signal receiver (not shown) which receives inputs from a radio frequency transmitter (not shown). The inputs can initiate and cancel the operation of the slide out assembly.

Referring to FIGS. 4 and 14–16, the electronic control unit 78 also controls two latches 110 which lock the slide out section 12 in either the extended or retracted positions. The latches 110 are fixed to the top plate 28 of the slide out section 12, and have extendable pins 112 which can be extended perpendicular to the slide out section sidewalls 24 into holes 114, 116 formed in the vehicle 10. Preferably, the latches 110 are actuated automatically by the electronic control unit 78 to lock the slide out section 12 in the desired position, once the limit switches 106, 108 signal the electronic control unit that the slide out section 12 is in the desired position.

A first set of holes 114 formed in the vehicle interior 20 receive the pins 112 when the slide out section 12 is in the retracted position. A second set of holes 116 formed in the vehicle 10 between the first set of holes 114 and the vehicle exterior wall opening 22 receive the pins 112 when the slide out section 12 is in the extended position.

Each latch 110 is electrically connected to the electronic control unit 78, and includes a reversible motor 118 which axially drives the pin 112 between a latch position and an unlatch position. Preferably, the motor 118 includes a Hall-effect sensor which senses each rotation of the motor spindle. Upon completion of a predetermined number of rotations indicating a known length of extension or retraction of the pin 112, the electronic control unit 78 cuts power to the motor 118 to stop axial movement of the pin 112.

Figure 17:
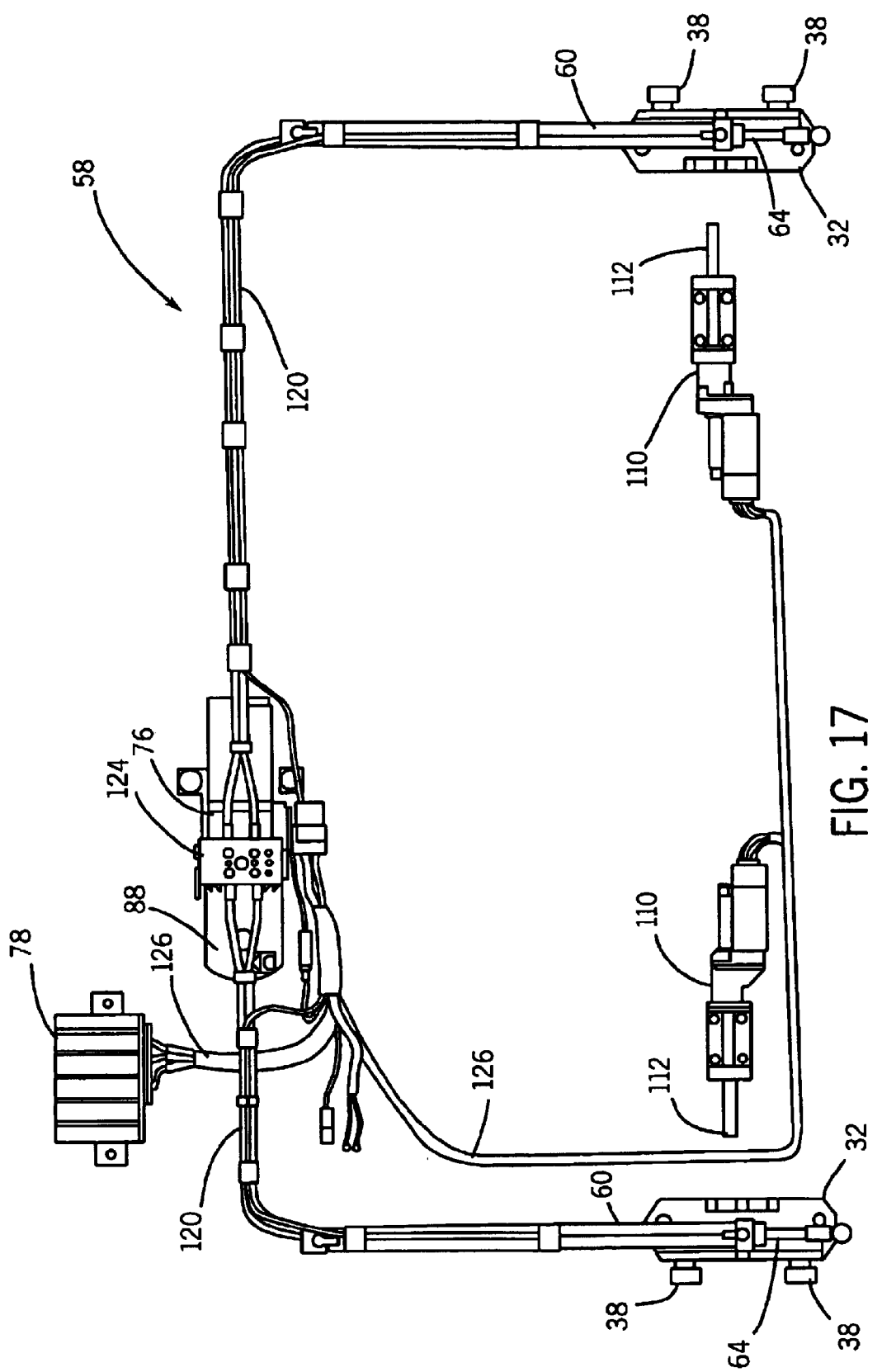
FIG. 17 is a perspective view of the slide out actuating assembly incorporating the present invention.

Advantageously, as shown in FIGS. 13 and 17, the slide out actuating assembly 58 can be a closed, self-contained system which is easily installed beneath the platform in the vehicle. The actuators 60 are connected by hoses 120 to a valve block 124 containing the hydraulic circuitry. The pump 76 and the reservoir 88 are attached to, and in fluid communication with the valve block 124. The electronic control unit 78 is electrically connected to the pump 76, limit switches 106, 108, and latches 110 using wires 126.

Figure 4:
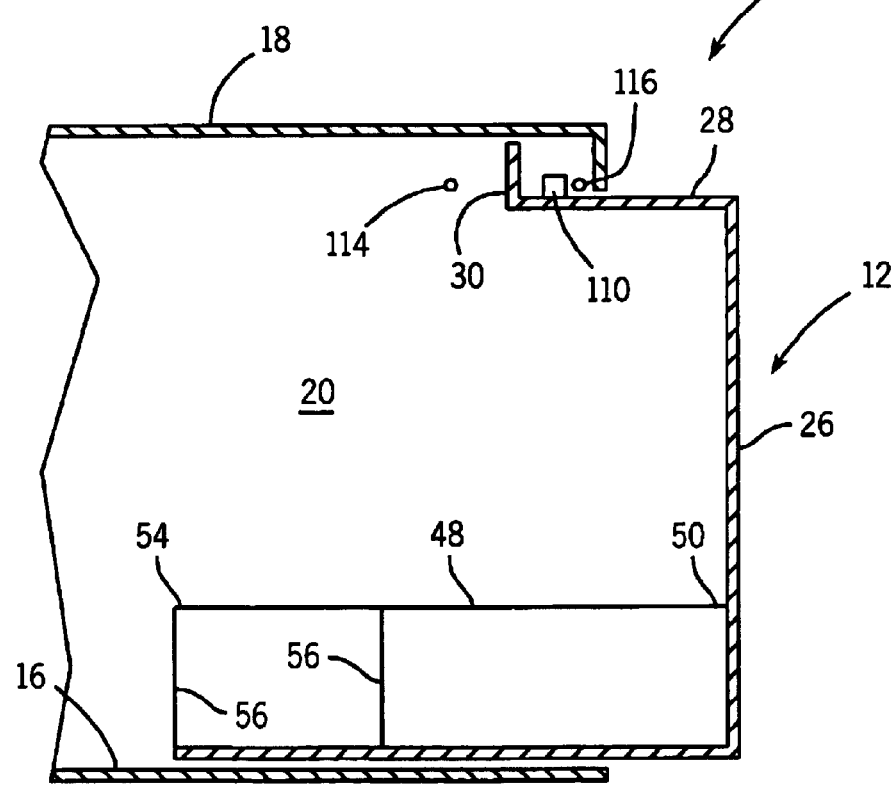
FIG. 4 is a cross sectional view of the slide out section of FIG. 3 partially extended.

In use, referring to FIGS. 4 and 13, the slide out section 12 is extended from the retracted position to the extended position by retracting the latch pins 112 from the first set of holes 114, and energizing the pump 76 to force fluid through the retraction circuit 68 to retract the actuator rams 64. As the rams 64 are retracted, the slide out section 12 is pulled outwardly toward the extended position. When the limit switches 106 are tripped indicating that both rams 64 are fully retracted, the pump 76 is deenergized and the latch pins 112 are extended into the second set of holes 116 to lock the slide out section 12 in the extended position.

The slide out section 12 is retracted from the extended position to the retracted position by retracting the latch pins 112 from the second set of holes 116, and energizing the pump 76 to force fluid through the extension circuit 72 to extend the actuator rams 64. As the rams 64 are extended, the slide out section 12 is pushed inwardly toward the retracted position. When the limit switches 108 are tripped indicating that both rams 64 are fully extended, the pump 76 is deenergized and the latch pins 112 are extended into the first set of holes 114 to lock the slide out section 12 in the retracted position.

In another embodiment of the invention, the pump 76 and hydraulic circuitry 66 is modified by adding additional hydraulic valves to provide pressurized hydraulic fluid to other hydraulic actuators. For example, the pump can supply hydraulic fluid to hydraulic actuators which slidably move a second slide out section, such as a kitchen section. In addition, the pump can supply hydraulic fluid to leveling feet which level the vehicle when parked.

In another embodiment of the present invention, a fluid actuating mechanism 200 includes two or more fluid actuators 202, 204, such as hydraulic actuators, having extendible rams 206, 208 extendible from cylinders 207, 209. The actuators 202, 204 are actuated by a fluid circuit 210 schematically shown in FIG. 18. The fluid circuit 210 in this embodiment includes a dual spool flow divider 212 that synchronizes the extension and retraction of the actuator rams 206, 208 regardless of the pressure of the fluid in the actuators 202, 204. A pump 214 supplies fluid, such as hydraulic fluid, air, and the like, to the actuators 202, 204 through the flow divider 212 which divides the fluid to extend the rams 206, 208 together, When retracting the rams 206, 208, the pump 214 supplies the fluid directly to the actuators 202, 204, and the actuators 202, 204 exhaust fluid through the flow divider 212 which combines the fluid from the actuators 202, 204 to synchronize the rams 206, 208 as they retract. Check valves 216, relief valves 218, and a cross flow valve 220 can be provided according to standard hydraulic circuit design parameters.

Figure 18:
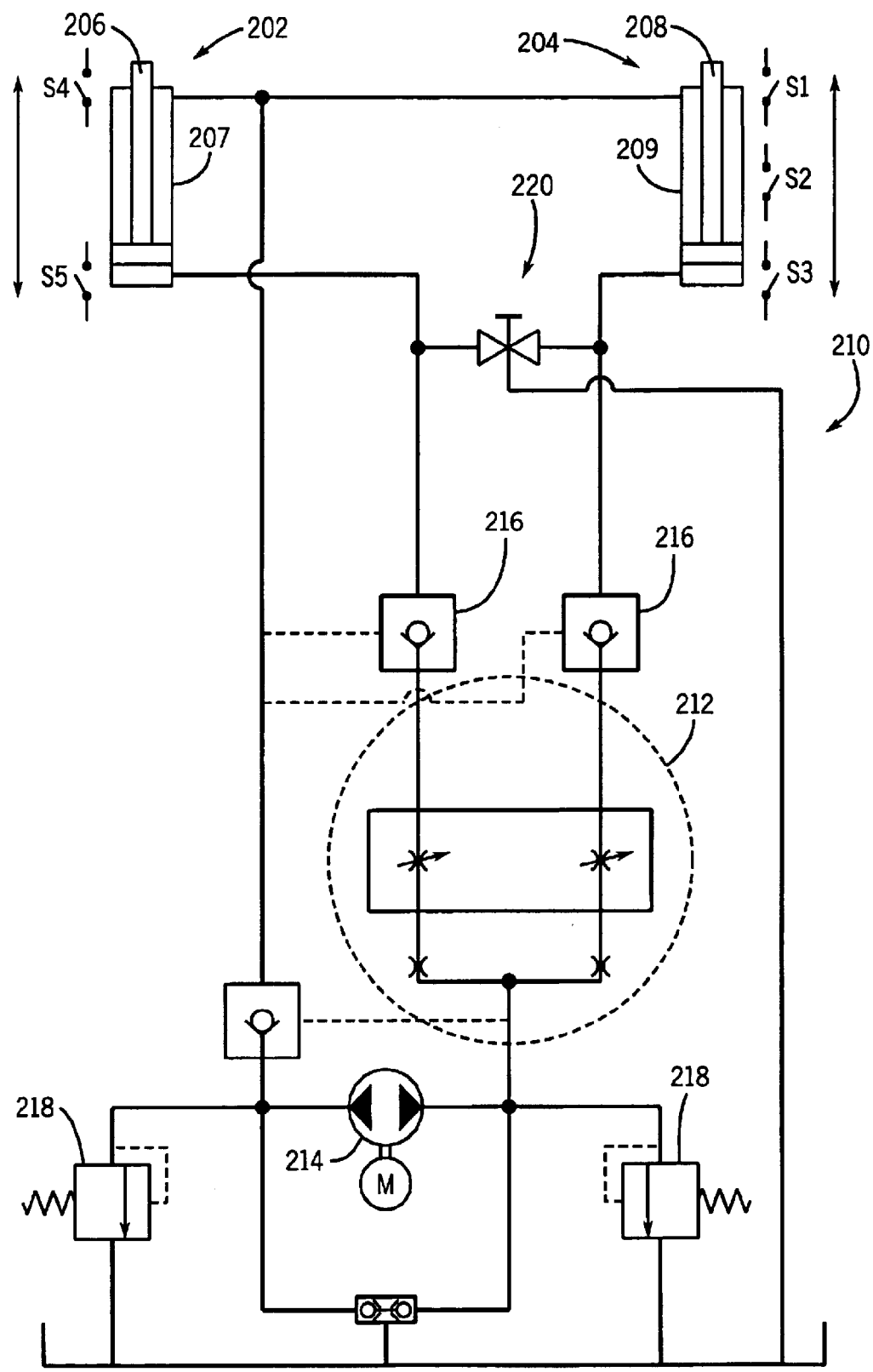
FIG. 18 is a hydraulic diagram of an alternate slide out actuating assembly.
Figure 19:
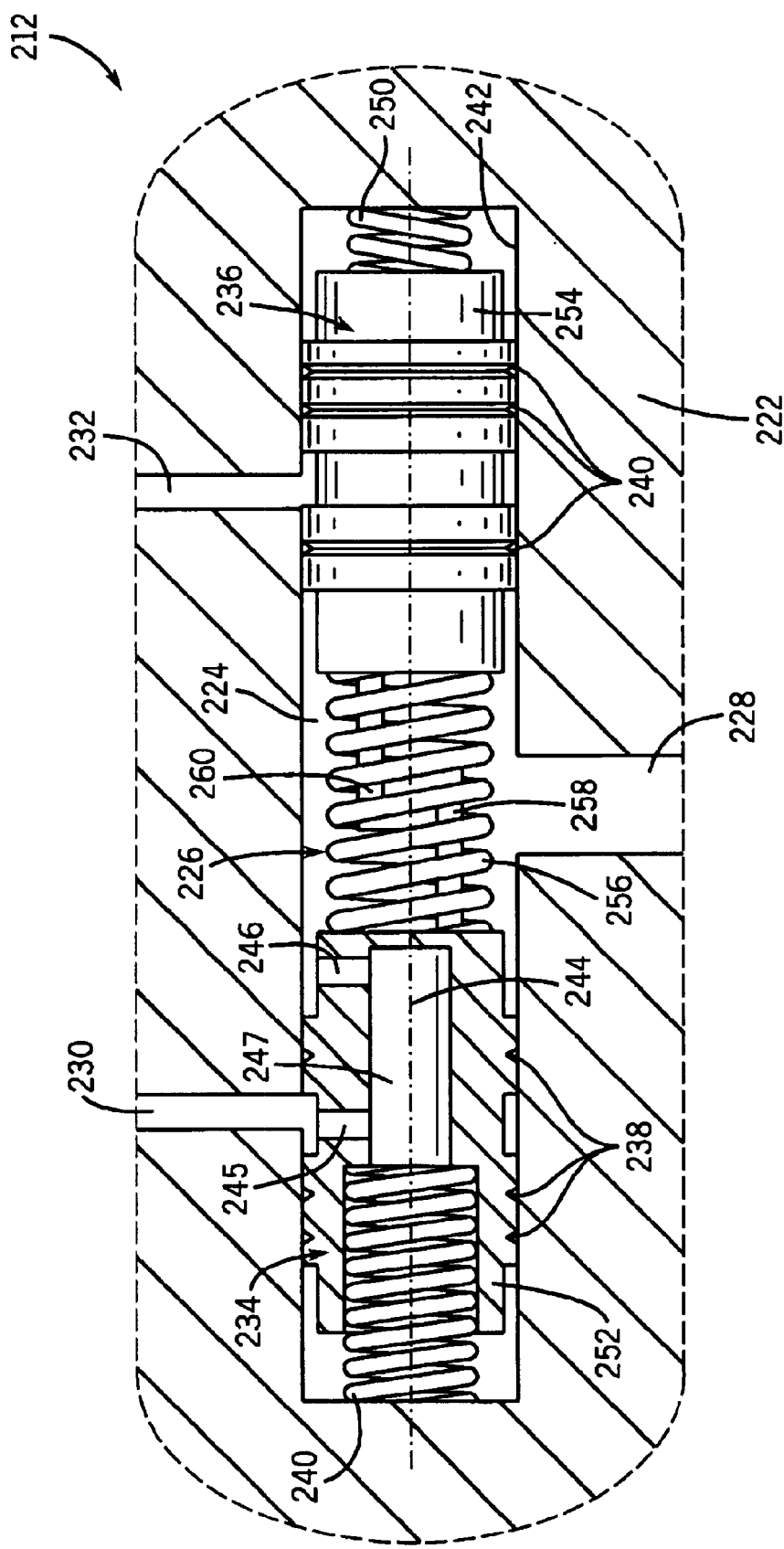
FIG. 19 is a sectional view of the flow divider shown in FIG. 18.

Referring to FIGS. 18 and 19, the flow divider 212 includes a body 222 having a spool cavity 224. The spool cavity 224 includes a central portion 226 in fluid communication with a center port 228. The center port 228 is in fluid communication with the fluid pump 214. When extending the rams 206, 208, fluid is pumped by the fluid pump 214 through the center port 228 into the central portion 226 of the spool cavity 224. The fluid exits the spool cavity 224 through left and right fluid ports 230, 232 in fluid communication with the spool cavity 224. Left and right spools 234, 236 are disposed in the spool cavity 224 on opposing sides of the central portion 226 of the spool cavity 224.

Each spool 234, 236 is slidably movable in the spool cavity, and controls the flow of fluid through the one of the fluid ports 230, 232 by varying the size of the entrance to the fluid ports 230, 232 in response to a pressure difference between a pressure at one of the fluid ports 230, 232 and a pressure at the center port 228. Circumferential seals 238, 240 surrounding each spool 234, 236 sealingly engage the spool cavity wall 242 to prevent fluid from passing between the respective spools 234, 236 and the spool cavity wall 242.

An internal passageway 244 formed through each spool 234, 236 defines a path past the respective seals 238, 240 when the respective spool 234, 236 is properly positioned relative to one of the fluid ports 230, 232. Only the internal passageway 244 through the left spool 234 providing a fluid path between the central portion 226 and the left fluid port 230 is shown. However, it is understood that the right spool 236 includes a substantially identical internal passageway 244 providing a fluid path between the central portion 226 and the right fluid port 232. Each internal passageway 244 includes a radially extending passageway 245, 246 on opposing sides of the seals 238, 240 that are fluidly connected by an axial passageway 247 to bypass the seals 238, 240 of the respective spools 234, 236.

Centering springs 248, 250 engaging one end 252, 254 of each spool 234, 236 urges the spools 234, 236 toward the central portion 226 of the spool cavity 224 against the urging of a center spring 256 interposed between the spools 234, 236. Interlocking arms 258, 260 prevent the center spring 256 from separating the spools 234, 236 beyond a predetermined distance. Absent forces exerted on the spools 234, 236 by fluid flowing through the spool cavity 224, the springs 248, 250, 256 properly position the spools 234, 236 to allow fluid to flow between the central portion 226 of the spool cavity 224 and the fluid ports 230, 232.

Figure 20:
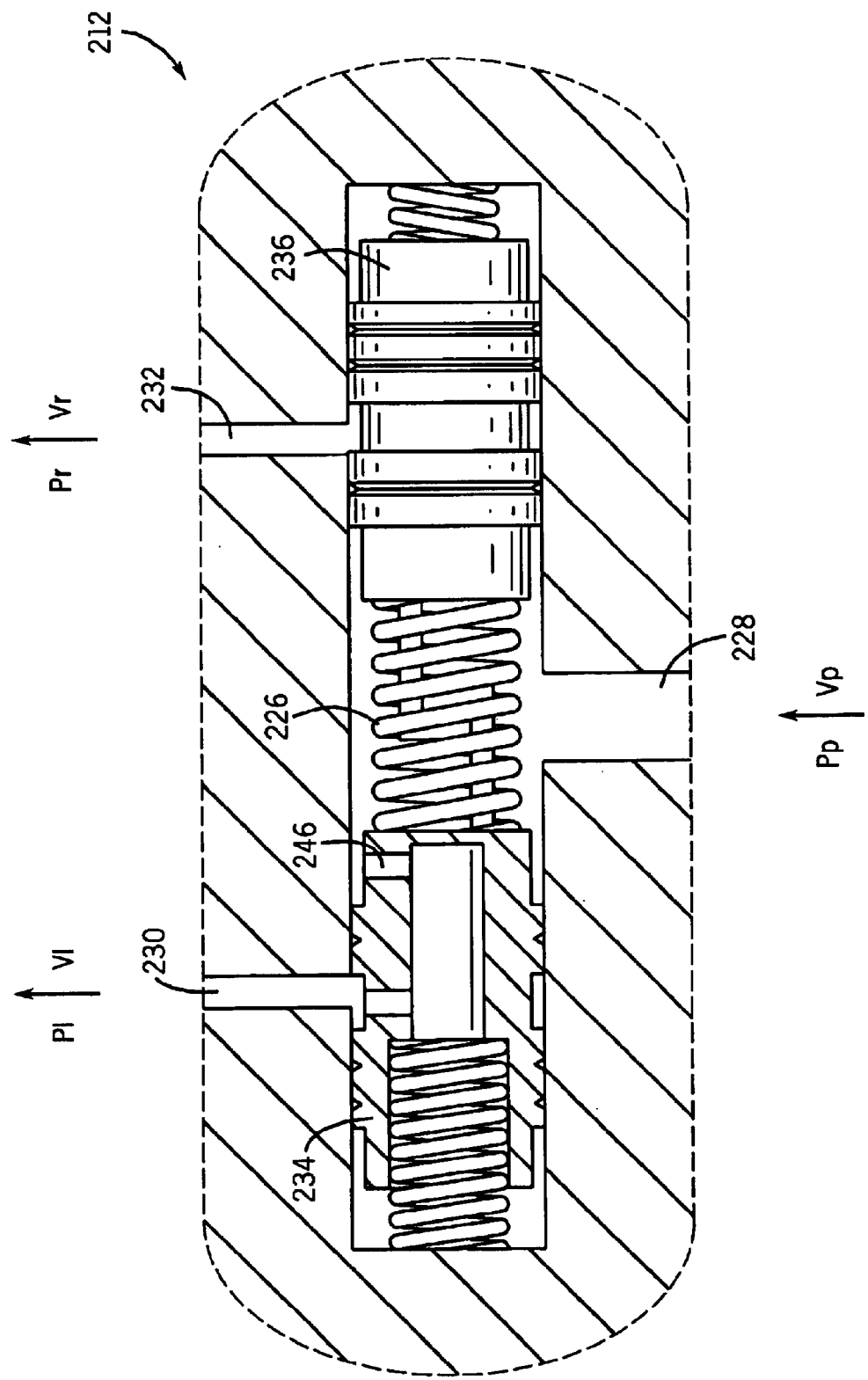
FIGS. 20–23 are sectional views of the flow divider shown in FIG. 18.

The flow divider 212 synchronizes the extension and retraction of the rams 206, 208 by controlling the flow of fluid through the fluid ports 230, 232 based on the determination of the flow and the related differences in fluid pressure in the cylinders 207, 209. As shown in FIG. 20, when the spools 234, 236 are in their central positions, fluid flowing from the pump 214 towards the cylinders 207, 209 enters the central portion 226 of the spool cavity 224 through the center port 228, passes through the spool passageways 244, and flows toward the cylinders 207, 209 through the fluid ports 230, 232. In FIGS. 20–23, Vp=volume flow from/towards pump;

Vr=volume flow from/towards cylinder, right;

Vl=volume flow from/towards cylinder, left;

Pp=pressure at pump side;

Pr=pressure at cylinder side, right; and

Pl=pressure at cylinder side, left.

Figure 21:
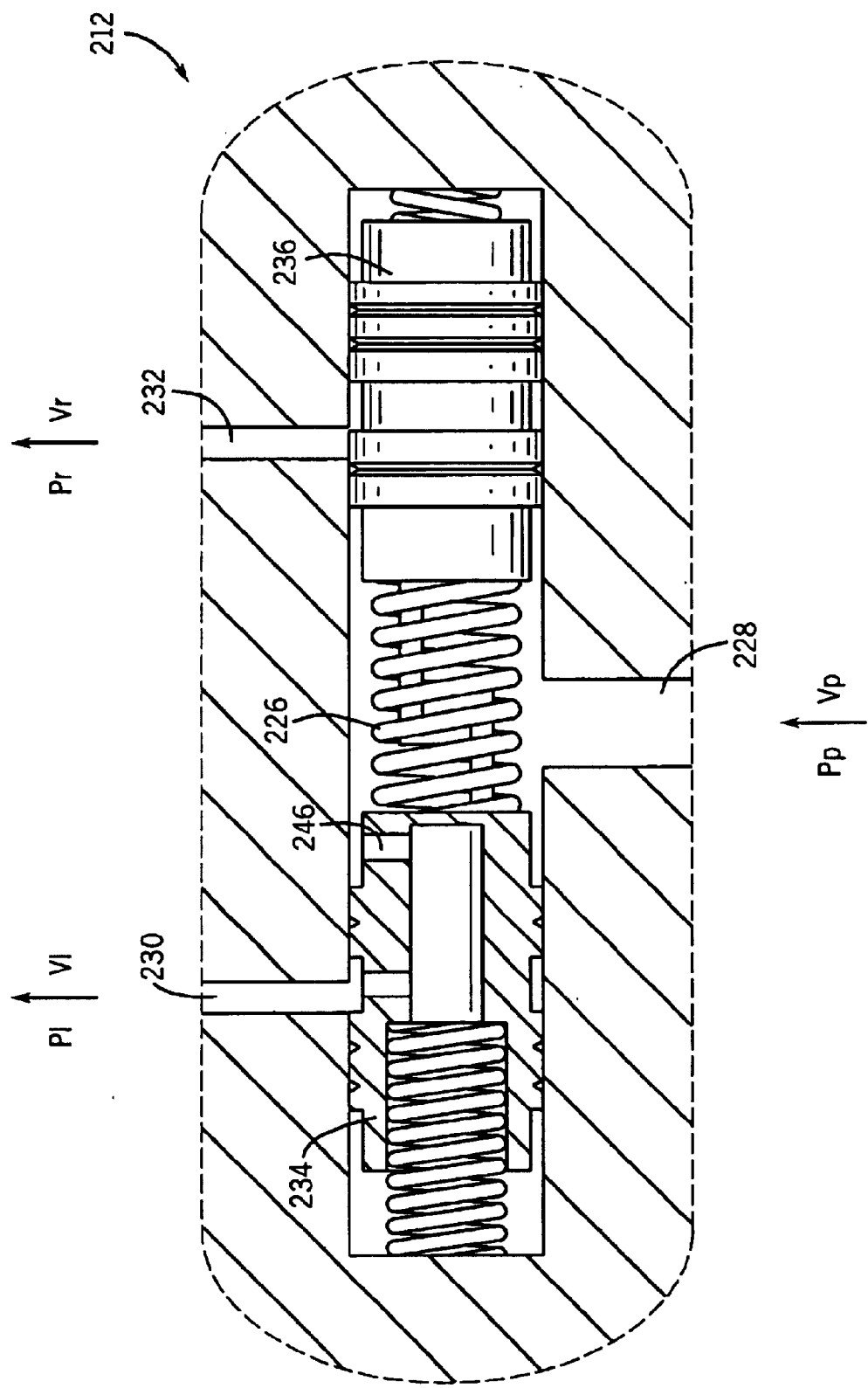

The spools 234, 236 remain in their respective central positions when the pressure and fluid flow in the cylinders 207, 209 is equal. However, when the pressure on, for example, the left cylinder 207 exceeds that which is exerted on the right cylinder 209, such as shown in FIG. 21, the fluid flow towards the left cylinder 207 will be less than the fluid flow towards the right cylinder 209. Consequently, the pressure drop past the left spool 234 will be less than the pressure drop past the right spool 236. As a result, the fluid pressure in the central portion 226 of the spool cavity 224 will push the right spool 236 to the right (i.e., Vl<Vr→Pp−Pl<Pp−Pr→right spool to the right) to reduce the entrance into the right fluid port 232, or if the pressure difference is sufficient, completely blocking the right fluid port 232, to balance the flow of fluid through the fluid ports 230, 232 and synchronize the extension of the rams 206, 208. This, of course, equally applies to the opposite (i.e., greater pressure in the right cylinder resulting in Vl>Vr→Pp−Pl>Pp−Pr→left spool to the left).

Figure 22:
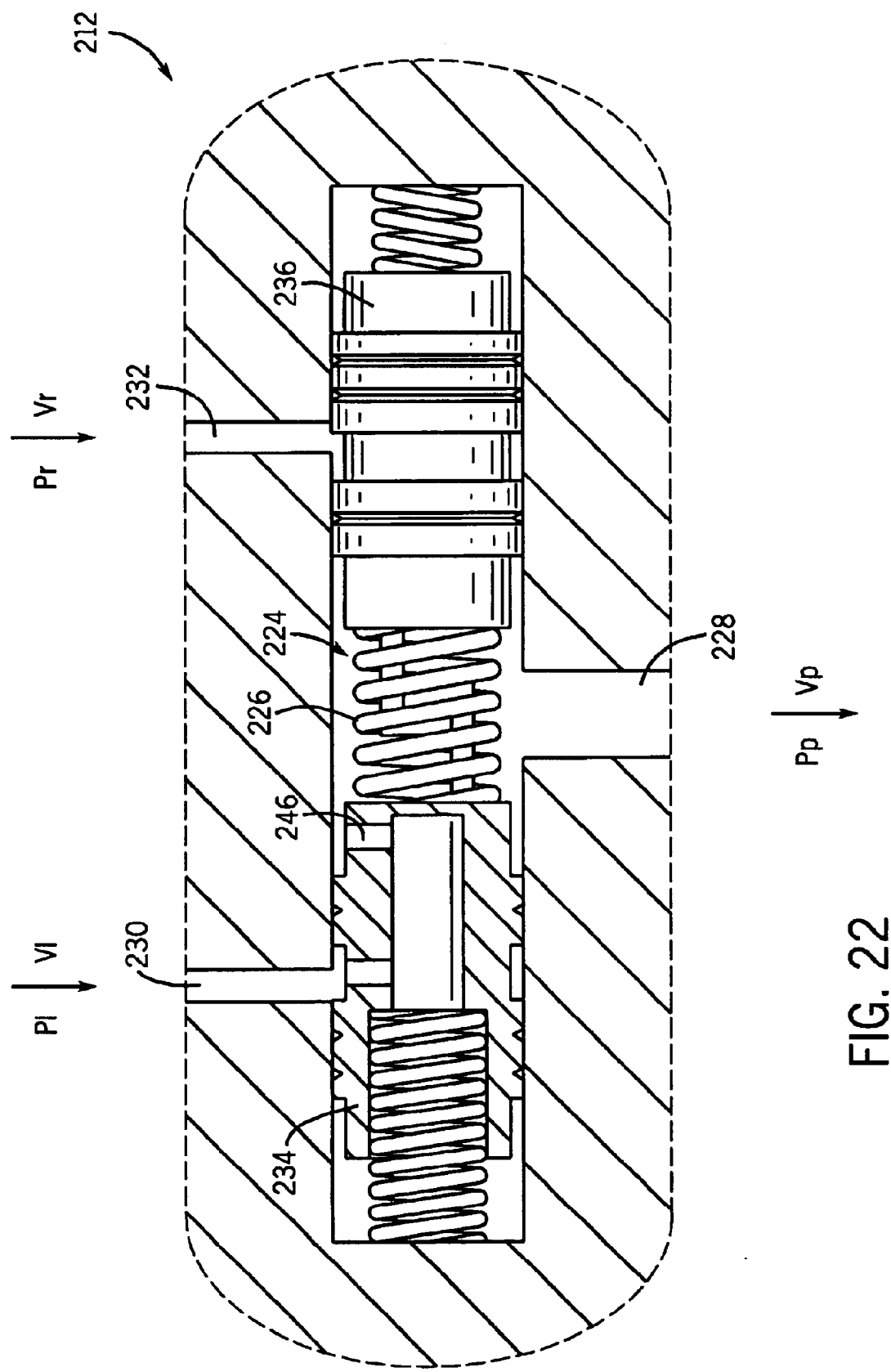

Likewise, the flow divider 212 controls the flow of fluid to synchronize the rams 206, 208 when fluid flows in the reverse direction from the cylinders 207, 209 to pump 214. As shown in FIG. 22, when the spools 234, 236 are in their central positions, fluid flowing from the cylinders 207, 209 towards the pump 214 enters the spool cavity 224 through the fluid ports 230, 232, passes through the spool passageways 244 into the central portion 226 of the spool cavity 224, and flows toward the pump 214 through the center port 228.

Figure 23:
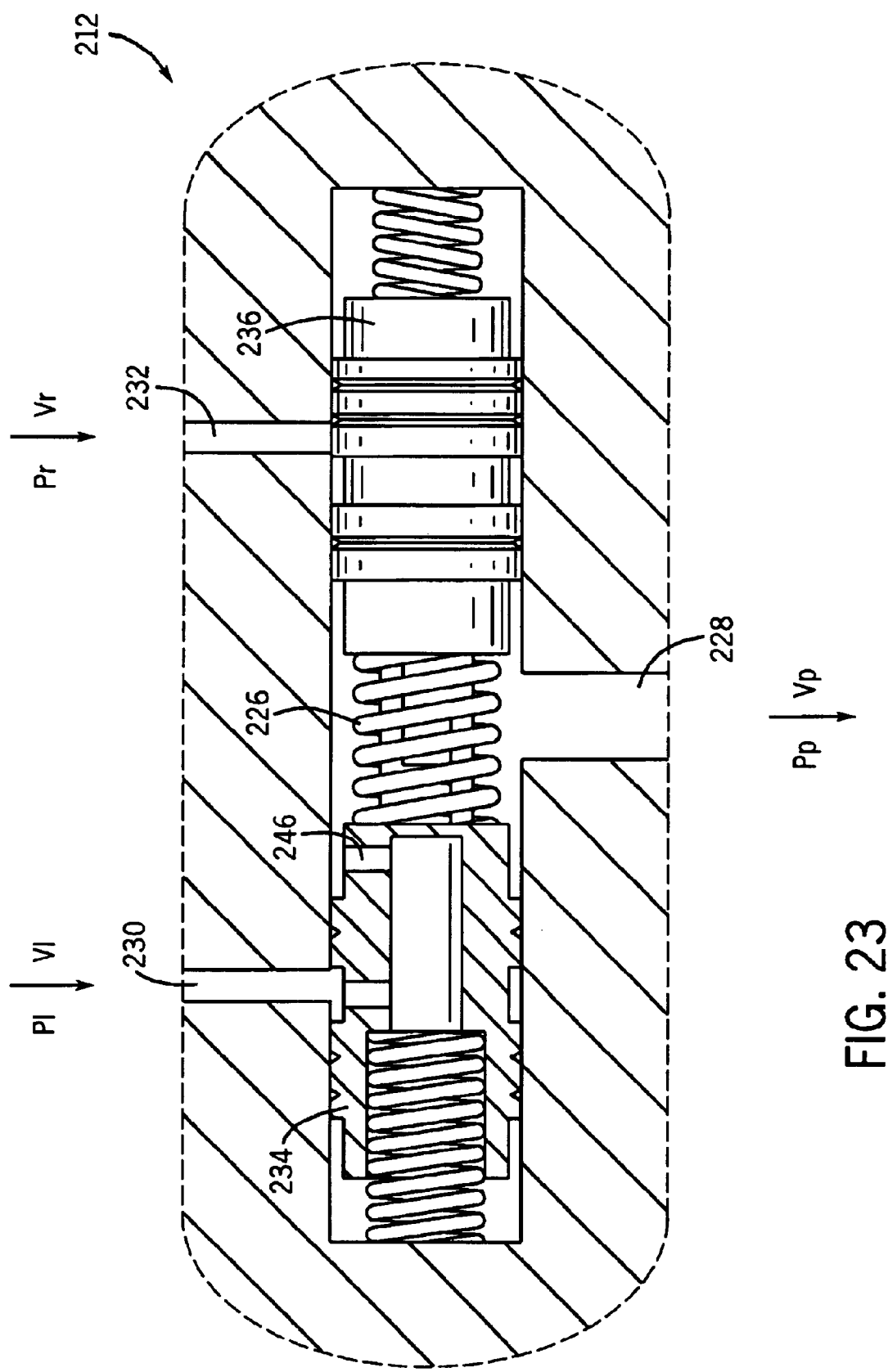

FIG. 22 shows the flow divider spools 234, 236 in their respective central positions with flow coming from the cylinders 207, 209 having equal pressure and fluid flow. However, when the pressure in the right cylinder 209 exceeds that which is exerted in the left cylinder 207, such as shown in FIG. 23, the flow from the left cylinder 207 to the pump 214 will be less than the flow from the right cylinder 209 to the pump 214. Consequently, the pressure drop past the right spool 236 will be greater than the pressure drop past the left spool 234. The fluid pressure imbalance coming from the cylinders 207, 209 causes the right spool 236 to move toward the left (i.e., Vr>Vl→Pr−Pp>Pl−Pp→right spool to the left) to reduce the entrance at the right fluid port 232, or if the pressure difference is sufficient, nearly or completely blocking the right fluid port 232, to balance the flow of fluid through the fluid ports 230, 232 and synchronize the retraction of the rams 206, 208 regardless of the fluid pressure at the fluid ports 230, 232, and thus in the cylinders 207, 209. This, of course, equally applies to the opposite (i.e., greater pressure in the left cylinder resulting in Vr<Vl→Pr−Pp<Pl−Pp→left spool to the right).

Figure 24:
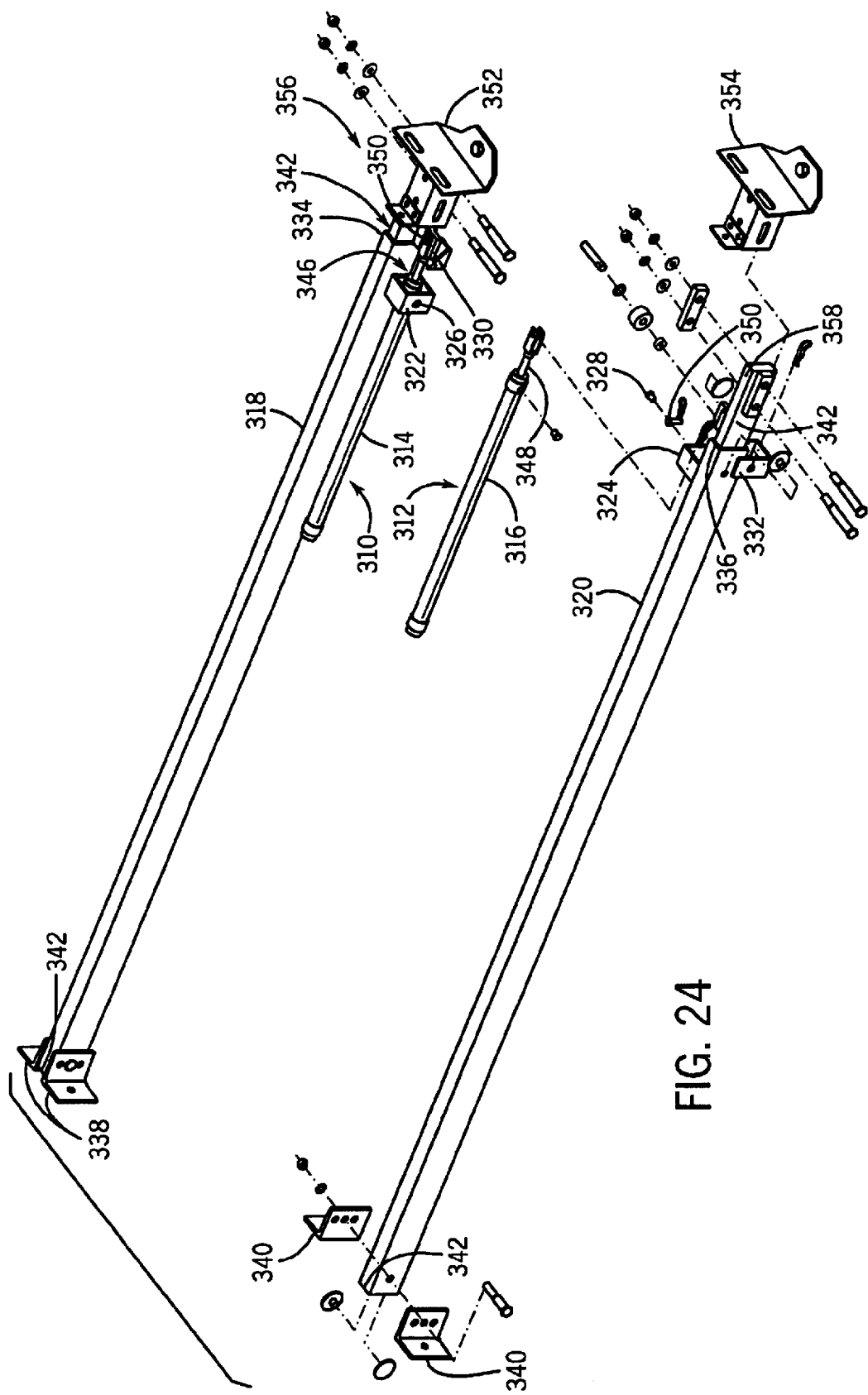
FIG. 24 is a partially exploded perspective view of an alternative vehicle slide out actuating mechanism.

In an alternative embodiment shown in FIG. 24, two or more double acting actuators 310, 312 forming part of a fluid circuit, such as shown in FIG. 18, move a slide out portion (not shown). In FIG. 24, each actuator 310, 312 includes a cylinder 314, 316 fixed to an outer rail 318, 320 by a cylinder bracket 322, 324. Each cylinder bracket 322, 324 is welded to the respective outer rail 318, 320, and a pin 326, 328 fixes the cylinder 314, 316 to the respective bracket 322, 324. Each outer rail 318, 320 is fixed relative to a vehicle body by a forward outer rail bracket 330, 332 fixed to a forward end 334, 336 of each outer rail 318, 320 and the vehicle body and a pair of rearward outer rail brackets 338, 340 fixed to a rearward end 342 of each outer rail 318, 320 and the vehicle body. The forward and rearward outer rail brackets 334, 336, 338, 340 are pinned or bolted to the respective outer rail 318, 320 and bolted or welded to the vehicle body. Of course, the cylinders 314, 316 can be fixed to vehicle body without departing from the scope of the invention.

An inner rail 342, 344 slidably received in each outer rail 318, 320 is slidably movable between an extended and retracted position. Each inner rail 342, 344 is fixed to a ram 346, 348 extending from one of the actuator cylinders 314, 316 by a pin 350. The slide out portion is fixed to each inner rail 342, 344 by an inner rail bracket 352, 354 fixed to a forward end 356, 358 of the respective inner rail 342, 344 extending from the respective outer rail 318, 320. Each inner rail bracket 352, 354 is bolted to the forward end 356, 358 of the respective inner rail 352, 354 and the slide out portion. Of course, the rams 346, 348 can be directly fixed to the slide out portion, such as by bolts, pins, and the like, or as described above, without departing from the scope of the invention. Moreover, the cylinders 314, 316 can be fixed relative to the slide out portion and the rams 346, 48 can be fixed relative to the vehicle body wherein actuation of the actuators 310, 312 slidably moves the slide out section relative to the vehicle body without departing from the scope of the invention.

Actuation of the hydraulic actuators 310, 312 extends the rams 346, 348 to slidably move the inner rails 342, 344, and thus the slide out portion, relative to the vehicle body. The hydraulic actuators 310, 312 are synchronized using a flow divider, as described above to ensure the rams 346, 348 extend together, and do not skew the inner rails 342, 344 or slide out section causing them to jam regardless of the forces exerted on the inner rails 342, 344 and slide out portion.

In another alternative embodiment of the present invention, a slide out actuating mechanism includes a fluid circuit having two flow dividers. Each flow divider controls either the function of extending the rams or the function of retracting the rams to synchronize the movement of the sides of the slide out section. Advantageously, by providing a flow divider for each function, each flow divider can be fine tuned specifically for the particular function the flow divider controls.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. A method of operating a slide out assembly forming part of a vehicle, wherein the slide out assembly includes an actuating mechanism including at least two hydraulic actuators, each of said hydraulic actuators having an extendible ram extendible from a cylinder, said extendible rams being fixed to at least one of a stationary portion of the vehicle and a slide out section, and said cylinders being fixed to the other of said stationary portion and said slide out section, on opposite sides of said slide out section said method comprising:

adjusting flows of fluid flowing to and from each of said cylinders when respectively extending and retracting said rams in response to fluid pressures in each of said cylinders so as to equalize said flows and synchronize the movement of the sides of said slide out section, at least one of said flows to said cylinders being adjusted by a flow divider upstream of said cylinders, and at least one of said flows from said cylinders being adjusted by said flow divider downstream of said cylinders.

2. The method as in claim 1, in which said flow divider includes at least two fluid ports, each of said fluid ports in fluid communication with one of said cylinders, wherein said flow divider maintains the flow of fluid flowing through said ports at substantially equal flow rates to synchronize movement of said rams when extending and retracting said rams relative to said cylinders.

3. The method as in claim 2, in which said flow divider includes at least two spools disposed in a spool cavity formed in a flow divider body, and each of said fluid ports is in fluid communication with said spool cavity, wherein each of said spools moves in response to a pressure difference between a pressure at one of said fluid ports and a pressure at a third port forming part of said flow divider and in fluid communication with said spool cavity.

* * * * *